Sept. 12, 1972  A. S. ROBINSON ET AL  3,690,854
METHOD FOR TEMPERATURE CONTROL OF IONIC ELECTRODE
Filed Aug. 21, 1969  10 Sheets-Sheet 1

Albert Sidney Robinson
Jack Lawrenson
Edward Russell Ormesher  Inventors

By Burns Doane Benedict
Swecker & Mathis
Their Attorneys

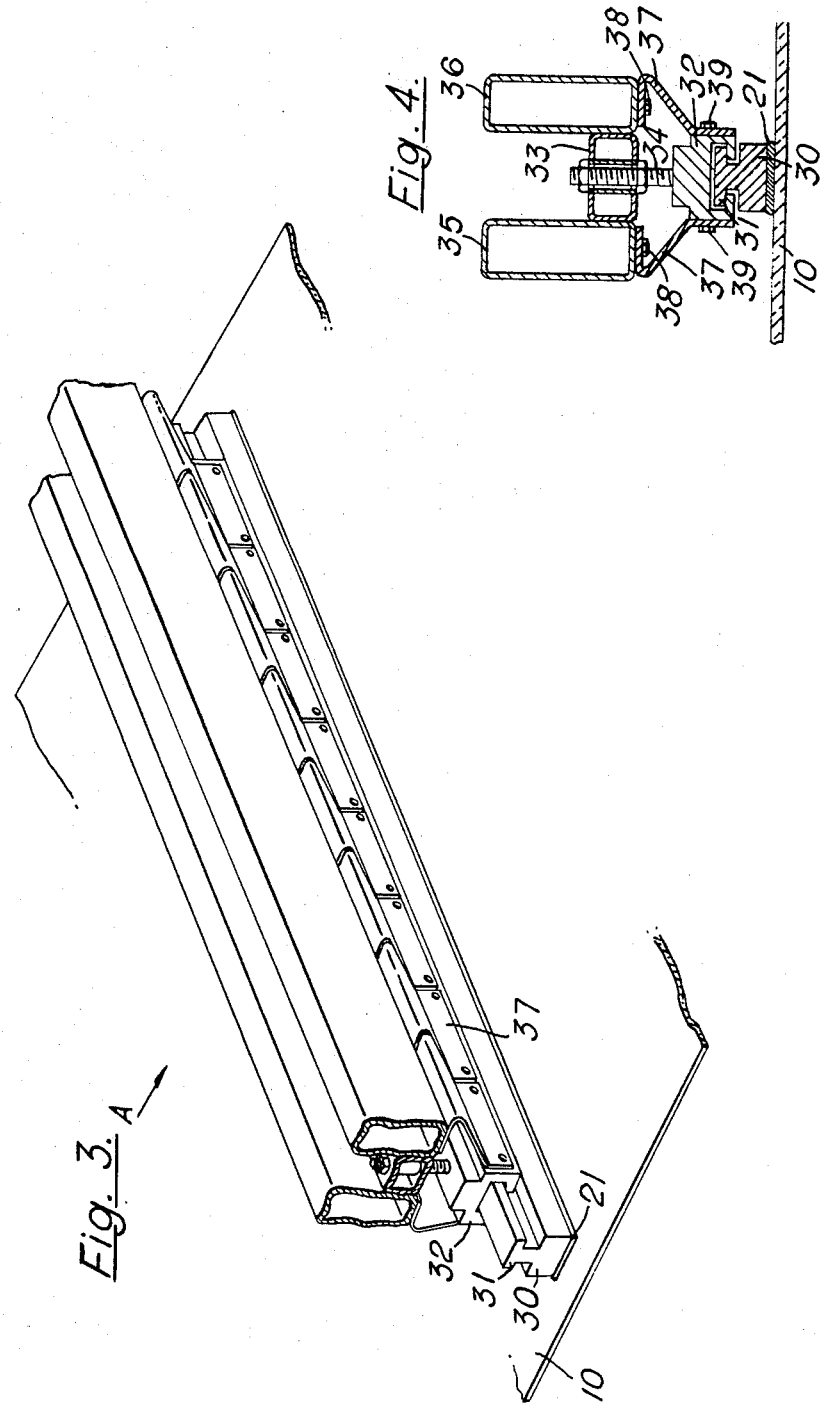

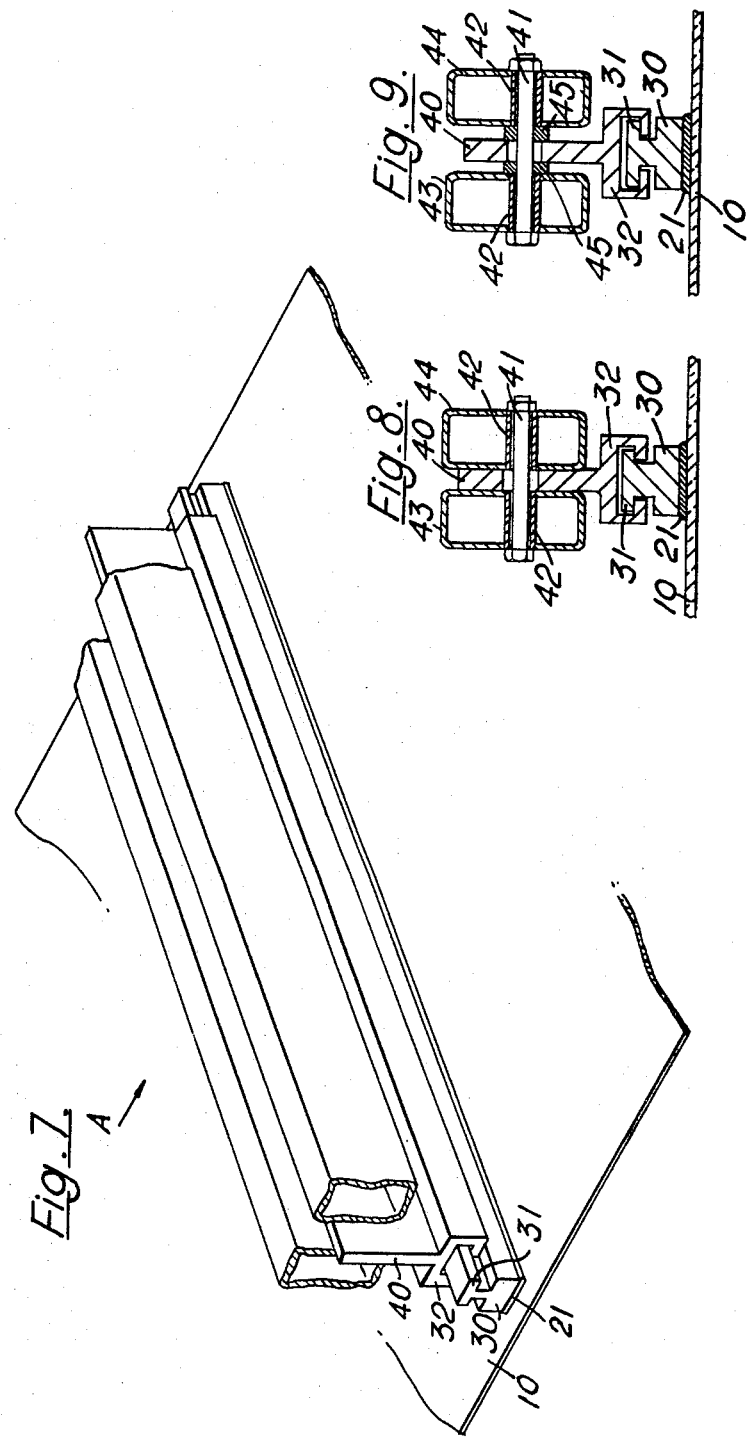

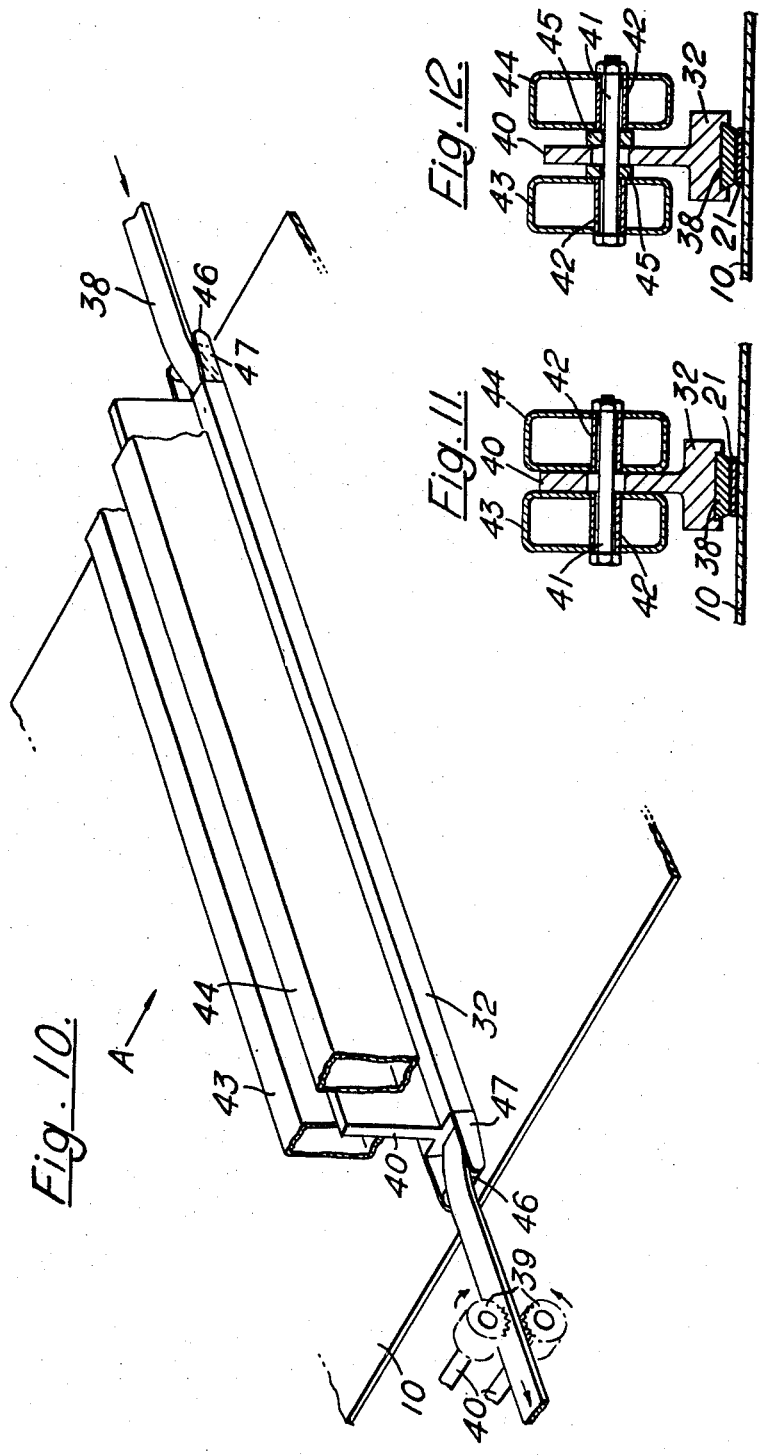

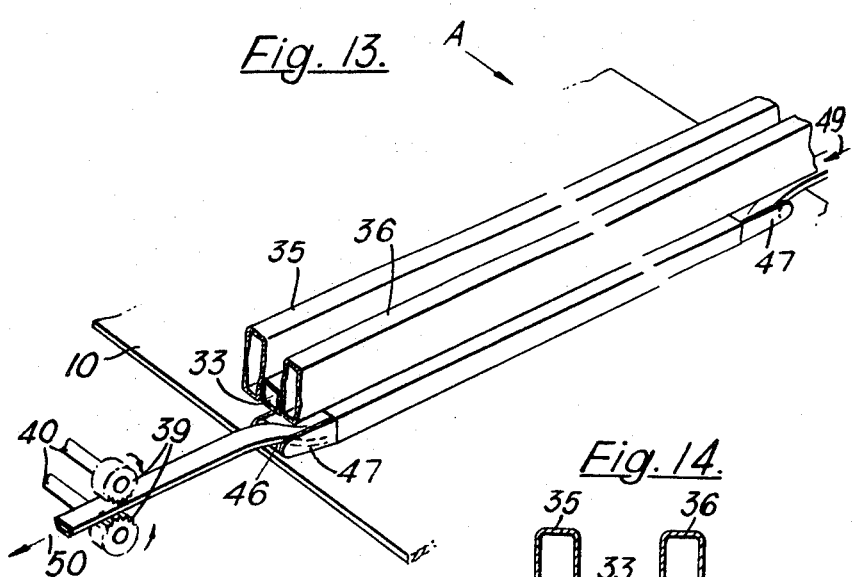
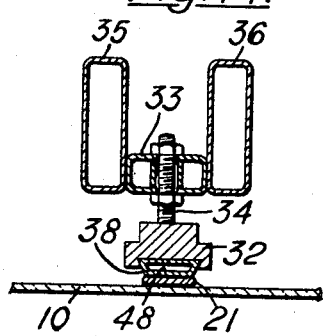

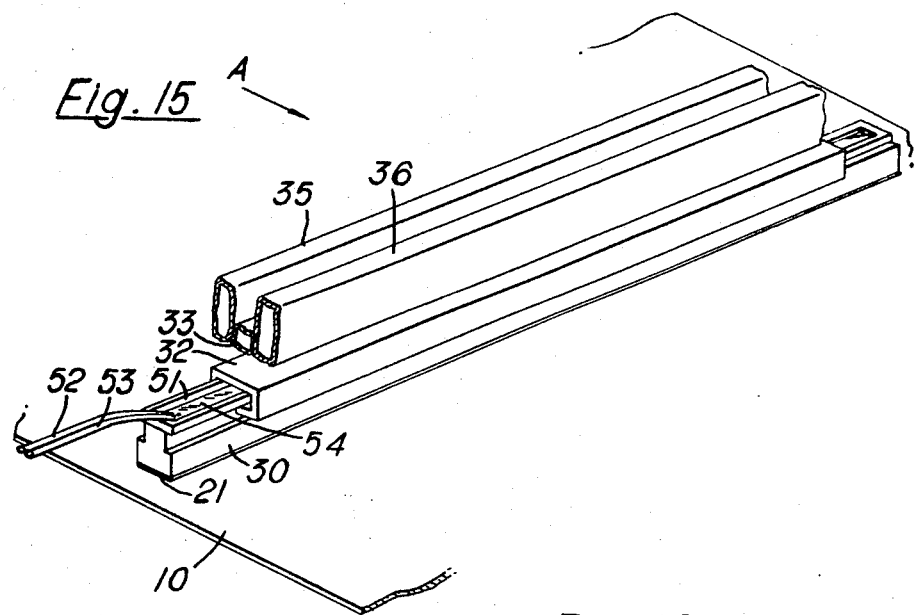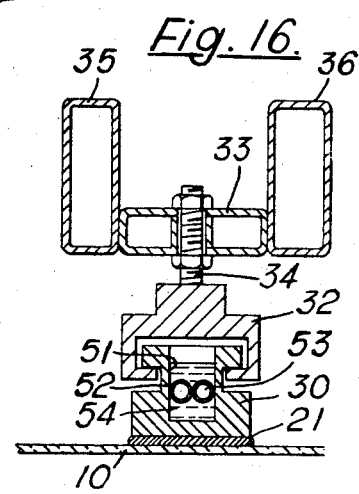

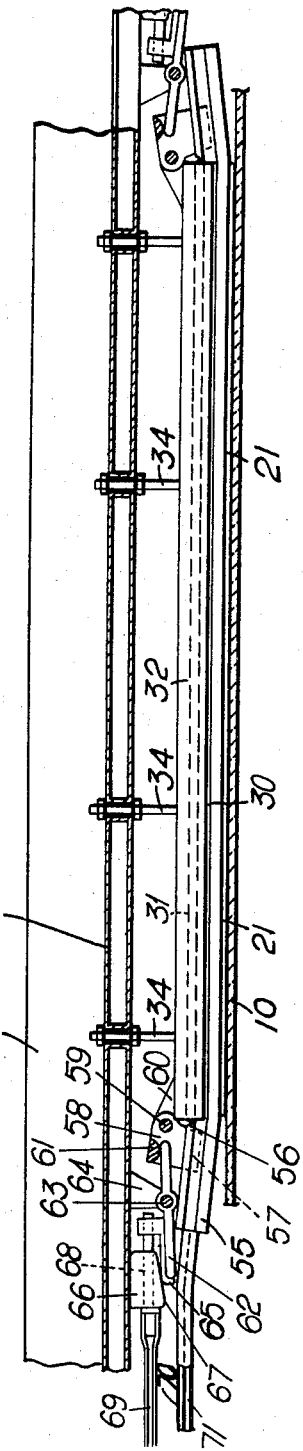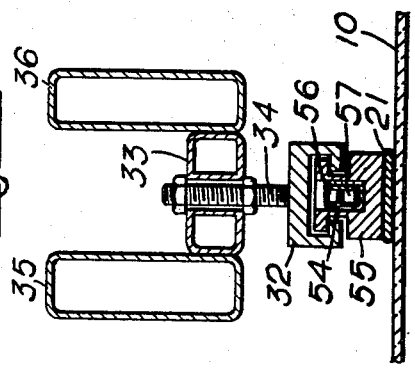

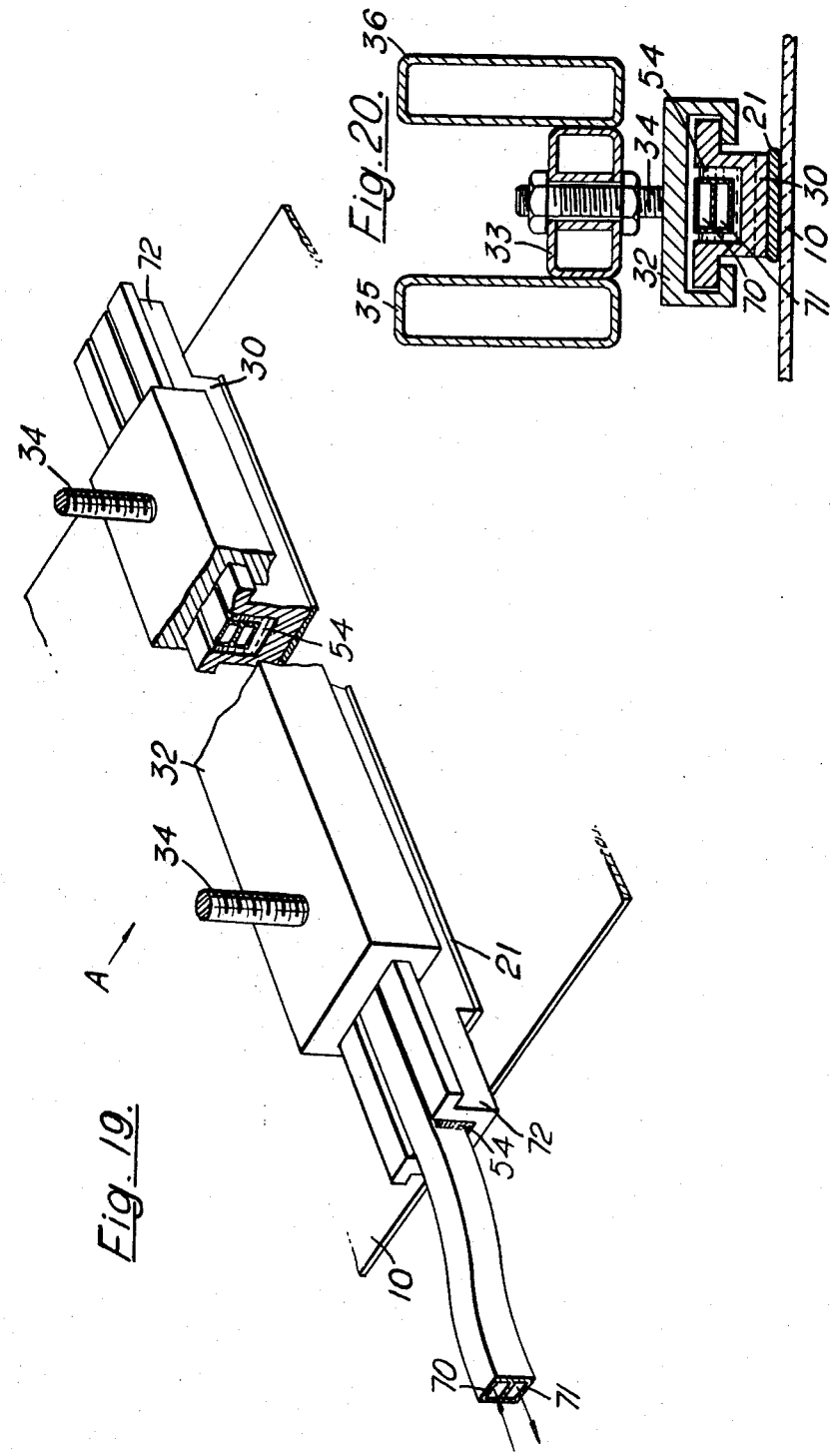

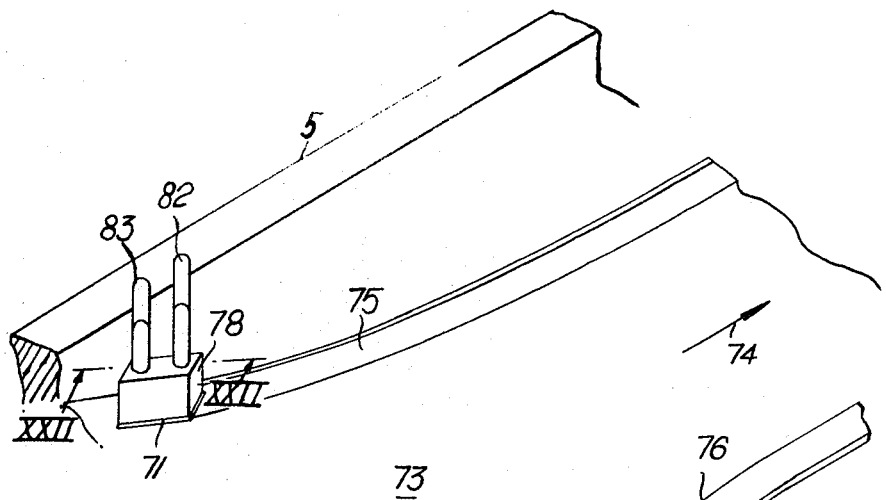
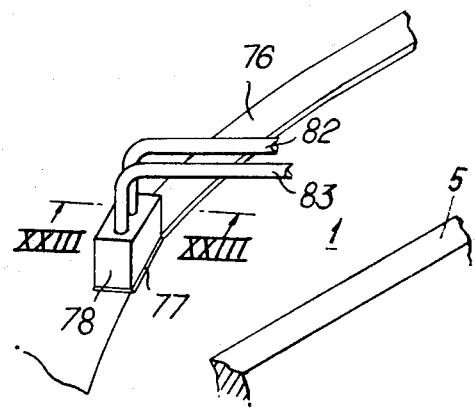
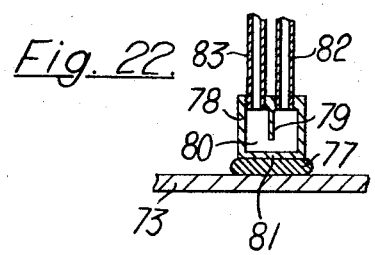

United States Patent Office 3,690,854
Patented Sept. 12, 1972

3,690,854
METHOD FOR TEMPERATURE CONTROL OF IONIC ELECTRODE
Albert Sidney Robinson, 7 Dunster Road, Birkdale, Southport, England; Jack Lawrenson, 22 Sackville Road, St. Helens, England; and Edward Russell Ormesher, 48 Heyes Ave., Rainford, England
Filed Aug. 21, 1969, Ser. No. 859,238
Claims priority, application Great Britain, Aug. 30, 1968, 41,595/68
Int. Cl. C03c 15/00; C03b 18/00
U.S. Cl. 65—30                                5 Claims

ABSTRACT OF THE DISCLOSURE

The characteristics of glass, e.g. float glass, are modified by a body of molten material which contacts the glass surface and clings to a locating member positioned adjacent the glass surface, and the temperature of that molten body is regulated independently of the temperature of the glass.

BACKGROUND OF THE INVENTION

This invention relates to methods and apparatus for the manufacture of glass in which heat exchange with the glass is effected.

It is a main object of the present invention to facilitate localised heat exchange with a glass surface without any danger of marring that surface.

Further the invention relates to the manufacture of glass having desired surface characteristics different from those inherent in the method of forming glass.

The surface of hot glass may be modified by contacting the glass with a molten material, for example a molten metal or alloy and causing controlled migration of an element from that body into the surface of the glass by controlling the passage of electric current from the body into the glass or by controlling the oxidation conditions in the region where the glass is contacted by the molten body.

A further object of the present invention is to assist thermally the regulation of that migration into the surface of the glass.

Surface modification of glass which is sufficiently hot to be receptive to that modification can be effected from a body of molten metal which clings to a locating member mounted adjacent the surface of the glass to be treated so that the glass surface is contacted by the molten metal body, and it is yet another object of the invention to control the solubility of the metal of the locating member in the molten metal body clinging to the locating member.

SUMMARY

The invention provides a method of manufacturing glass in which heat exchange with the glass surface is effected. The glass surface is contacted with a body of molten material clinging to a locating member positioned adjacent the glass, and the temperature of that body of molten material is regulated independently of the temperature of the glass resulting in localised heating or cooling of the glass surface.

BRIEF DESCRIPTION OF THE DRAWINGS

FIG. 3 is a perspective view, partly in section, of another embodiment of the invention as applied to the float process, for the cooling of a body of molten material contacting the glass surface,
FIG. 4 is a vertical section through the apparatus of FIG. 3,
FIG. 7 is a view similar to FIG. 5 of another form of locating member for a pool of molten material with its mounting,
FIG. 8 is a vertical section through the apparatus of FIG. 7,
FIG. 9 is a view similar to FIG. 8 showing a modified form of the apparatus for FIGS. 7 and 8,
FIGS. 10 and 11 are views similar to FIGS. 7 and 8 showing a modified form of the apparatus of those figures in which a continuously moving strip constitutes the operative surface of the locating member,
FIG. 12 is a view similar to FIG. 9 of a modified form of the apparatus for FIGS. 10 and 11,
FIG. 13 illustrates another form of locating member in the form of a continuously moving strip which is hollow and cooled,
FIG. 14 is a vertical section through the apparatus of FIG. 13,
FIGS. 15 and 16 illustrate another construction of locating member in which a cooler is embedded in the locating member for the body of molten material,
FIGS. 17 and 18 illustrate another embodiment of the invention in which a cooler is incorporated in a locating member mounted adjacently the upper surface of a ribbon of float glass,
FIGS. 19 and 20 illustrate a modified form of the apparatus of FIGS. 17 and 18,
FIG. 21 is a perspective view of a ribbon of float glass which is being attenuated on a bath of molten metal and showing two locating members for cooling the margins of the ribbon,
and
FIGS. 22 and 23 are sections on line XXII—XXII and XXIII—XXIII respectively of FIG. 21.

DESCRIPTION OF THE PREFERRED EMBODIMENT

Figure 1:
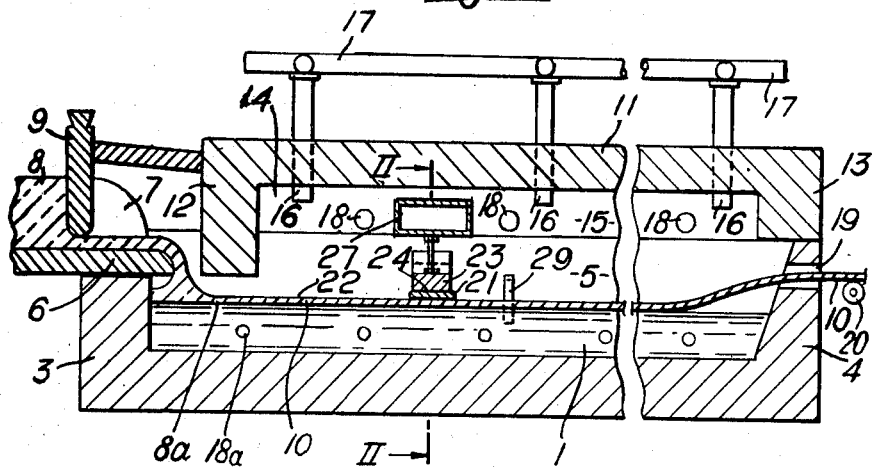
FIG. 1 is a sectional elevation through one embodiment of apparatus according to the invention as applied to the float process for the manufacture of flat glass.
Figure 2:
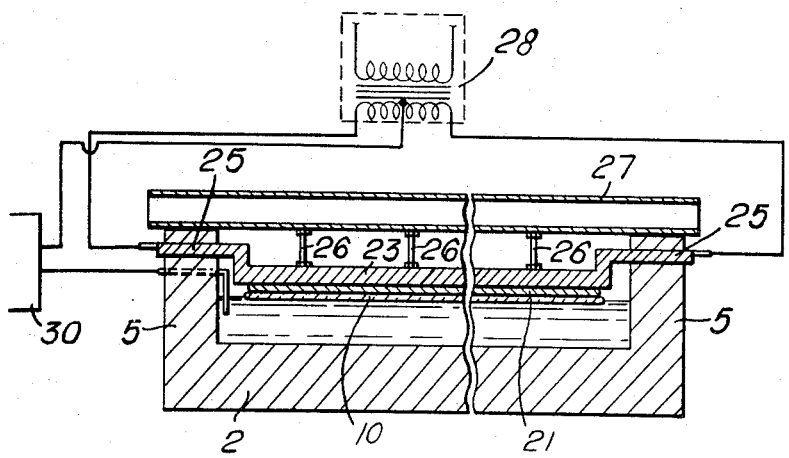
FIG. 2 is a section on line II—II of FIG. 1.

Referring to FIGS. 1 and 2 which illustrate the application of the invention to the surface modification of float glass produced by the float process for the manufacture of flat glass in ribbon form, a bath of molten metal 1 is contained in a tank structure constituted by a floor 2 an end wall 3 at the inlet end of the tank structure, an end wall 4 at the outlet end, and side walls 5. The floor 2 and walls 3, 4 and 5 form an integral structure. Mounted above the inlet end wall 3 there is a spout comprising a lip 6 and side jambs 7 which together constitute a spout of generally rectangular cross-section and molten glass from the forehearth of a melting furnace, which glass is indicated at 8, is held back by a regulating tweel 9 so that the flow of molten glass onto the surface of the bath of molten metal 1 is regulated to deliver molten glass at a controlled rate onto the bath to form a body of molten glass 8a on the bath surface which body is advanced in ribbon form along the bath as indicated at 10 after there has been lateral flow of the molten glass on the bath surface under the influence of surface tension and gravity.

Preferably the bath of molten metal is a bath of molten tin, or of a tin alloy having specific gravity greater than the glass. A roof structure is mounted over the tank structure and comprises a roof 11, end walls 12 and 13, and sidewalls 14. The roof structure defines a headspace 15 over the bath of molten metal in which headspace is a protective atmosphere maintained at a plenum. The atmosphere is fed through ducts 16 extending through the roof structure which are connected to a header 17 through which the protective atmosphere is supplied. The atmosphere may be inert, for example nitrogen, or may contain a reducing constituent, e.g. hydrogen.

The molten glass delivered to the bath is for example soda-lime-silica glass or heat absorbing glass having an iron content, and the temperature of the ribbon of glass 10 advanced along the bath is regulated by thermal regulators 18 mounted in the headspace over the bath and regulators 18a immersed in the bath of molten metal. At the inlet end of the bath the temperature of the glass is in the region of 1,000° C. and the glass is cooled as it is advanced until it is sufficiently stiffened to be taken unharmed from the bath by the time it reaches the outlet end of the bath. The glass is discharged through an outlet 19 on conveyor rollers 20 mounted outside the outlet end of the tank structure.

The glass is modified by the method of the invention during its advance along the bath by contacting the glass with a body of a molten material which causes surface modification of the glass, while the glass is still sufficiently hot to be receptive to surface modification. For example the glass may be at a temperature in the region of 900° C. to 700° C. A body of molten material 21 for example copper/tin alloy or copper/lead alloy or silver/bismuth alloy contacts the upper surface 22 of the hot ribbon of glass.

The body 21 wets on to a locating member of a material wetted by the molten body 21 and as illustrated the locating member is in the form of a beam 23 extending across the bath so as to bridge the path of travel of the ribbon of glass. The lower face 24 of the beam 23 is positioned just above the upper surface 22 of the glass so as to permit the clinging body 21 to subsist over the ribbon, located between the locating member and the glass surface.

The locating member 23 is a bar-shaped member of an electrically conductive and refractory metal for example tungsten or molybdenum. The beam is shaped so that its central portion dips downwardly towards the surface of the bath of molten metal and is formed with end pieces 25 by which the beam rests on the side walls 5 of the tank structure. The central part of the beam is suspended by struts 26 of electrically insulating material from a hollow section support beam 27 which is mounted across the tank structure. Cooling liquid, for example water, is circulated through the beam 27 in order to maintain the dimensional stability of that beam and assist in maintaining the desired uniformity in the gap existing between the lower surface 24 of the locating member 23 and the upper surface 22 of the ribbon of glass.

The ends of the beam 23 are connected to the secondary winding of a heavy duty power transformer 28 by which alternating current is passed through the locating member so as to regulate the temperature of that member. A heating current, for example 2000 amps, may be passed in this way through the locating member so as to maintain the pool 21 of molten material at a higher temperature than the ribbon of glass. This not only permits regulation of ionic migration from the body of molten material into the ribbon of glass but also enables materials of relatively high melting point to be employed for the pool of molten material. For example a body of pure gold wetted onto a tungsten bar can be maintained in this way at a temperature of 1100° C., the melting point of gold being 1063° C. and the modification of the surface of the glass to produce a solar heat rejecting gold film in that surface is then effected by the passage of a direct current from the body 21 of molten gold through the glass into the bath of molten metal. An electrode 29 dips into the bath of molten metal alongside the path of travel of the ribbon of glass and one end 25 of the tungsten locating member, and the electrode 29 are respectively connected to the output terminals of a DC supply indicated at 30.

Control of the alternating current passing through the locating member controls the melting and the subsequent temperature of the pool of molten gold while the separate control of the direct current controls the migration of gold into the upper surface of the glass.

The elongated area of contact between the body 21 of molten material and the upper surface of the glass has a width considered longitudinally of the ribbon of glass as illustrated, such that the glass surface is heated by the body of molten material during the passage of the glass beneath the body 21. This localised and transient heating of the glass surface assists the modification of the surface while it is beneath the body of molten material but immediately the glass passes from beneath that body it is again subjected to the ambient temperature conditions in the headspace over the bath of molten metal.

This transient heating of the glass surface enables high temperature treatments of the glass to be carried out without risk of distortion of the ribbon. For example, in the manufacture of glass with a cobalt blue colour, a glass temperature of about 900° C. is desirable. A molten cobalt/bismuth alloy body 21 is employed, clinging to a cobalt bar 23 located in the tank structure where the temperature of the glass is 700° C. The body 21 is heated to 900° C. and the surface treatment is carried out at that higher temperature by passage of a direct electric current from the hot body 21 through the cooler glass to the bath 1. Good blue colours are achieved in the glass, such as are associated with high temperature treatment, without any risk of distortion of the float surfaces of the glass. The high temperature of the cobalt/bismuth pool ensures sufficient solubility of cobalt in the pool to facilitate replenishment of the pool by dissolution of the cobalt bar 23.

The clinging of the body 21 of molten material to the locating member 23 by the wetting of that body onto the locating member ensures excellent thermal contact between the body 21 and the locating member 23 so that there can be accurate regulation of the heat exchange across the wetted interface.

Regulation of the temperature of the body 21 independently of the temperature of the glass can also be effected by extracting heat through the thermal contact of the body of molten material with the locating member which it wets. This thermal contact for cooling the body can be desirable in extracting heat from the surface of the ribbon of glass and also gives the important advantage that the body 21 can be maintained at a lower temperature than the glass so that when the body 21 is a molten alloy which is clinging to a locating member constituted by one of the metals of the alloy, the solubility of the metal of the locating member in the molten metal alloy of the body 21 can be accurately controlled.

For example, the body 21 may be of a copper/lead alloy and the locating member 23 may be a copper bar which at high temperatures of treatment near to the hot end of the bath, e.g. 900° C., would be relatively soluble in the alloy thereby causing erosion of the bar during the treatment. However by cooling the bar and the body of molten material to a temperature at which the copper of the bar is less soluble in the alloy the surface modification of the glass can be made even more efficient at the hot end of the bath because of the improved preservation of the surface of the locating member which is wetted by the molten body. Cooling of the bar additionally guards against any possible change in the glass surface due to the weight of the molten metal body.

Even near the cold end of the bath where the temperature of the glass is for example 700° C. it has been found advantageous to cool the pool 21 of molten copper/lead alloy for example to a temperature of 300° C. to 400° C. at which temperature the alloy is still molten but the copper of the locating member is much less soluble in the alloy, thereby reducing effects of wear on the bar in the course of continuous treatment of the glass.

One form of cooled locating member is illustrated in FIGS. 3 and 4 and this locating member is positioned in the tank structure containing the bath of molten metal in a location similar to that illustrated in FIGS. 1 and 2. This embodiment is intended for an electrolytic treatment of the upper surface of the ribbon of glass 10 which is advancing along the bath in the direction of the arrow A and the locating member is in the form of a copper anode 30 which is bar-shaped and to the lower face of which the pool 21 of a molten copper alloy clings, this pool being in contact with the upper surface of the advancing ribbon of glass 10.

The upper surface of the copper bar 30 has a T formation as illustrated at 31 which is keyed into a shaped metal shoe 32 which acts as a carrier for the copper anode bar 30. The shoe 32 is suspended from a water cooled central beam section 33 by means of hanger bolts 34. On either side of the central beam section 33 there is an elongated upstanding hollow beam section, respectively 35 and 36, which is in face to face abutment with the central part 33 of the beam. The unit formed by the three beams 33, 35 and 36 is supported across the tank structure between the side walls 5 in the same manner as the beam 27 illustrated in FIGS. 1 and 2. The lower faces of the beams 35 and 36 have flexible strips 37 of a good thermal conductor, e.g. copper, fixed to them by bolts 38 so that these strips, which are inturned at their upper ends, are held in good thermal contact with the lower faces of the beams 35 and 36. The lower ends of the flexible strips 37 are bent downwardly and are bolted at 39 to the sides of the metal shoe 32.

The flexible strips 37 provide a heat conducting path from the bar 30 through the shoe 32 and the strips 37 to the water cooled beam. Means for circulating water through the beams is provided outside the tank structure and the flow of water through the beams can be regulated to provide a further regulation of the heat extraction from the body 21 of molten material. Additionally the rate of heat extraction can be varied by the addition or removal of flexible strips 37.

By this means the temperature of the pool 21 can be maintained at a different temperature from that of the glass ribbon advancing beneath the pool 21. The migration of metal from the pool into the upper surface of the glass upon application of current passing through the anode and the pool 21 into and through the glass and into the bath of molten metal supporting the glass, is subjected to temperature regulation in this way. Additionally there is regulation of the solubility of the anode bar 30 in the pool 21 by maintaining a temperature at the wetted interface between the body 21 and the bar 30 which is different from the temperature of the upper surface of the glass advancing beneath the body 21.

Figure 6:
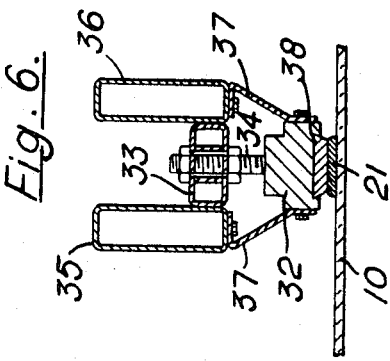
FIG. 6 is a vertical section through the apparatus of FIG. 5.
Figure 5:
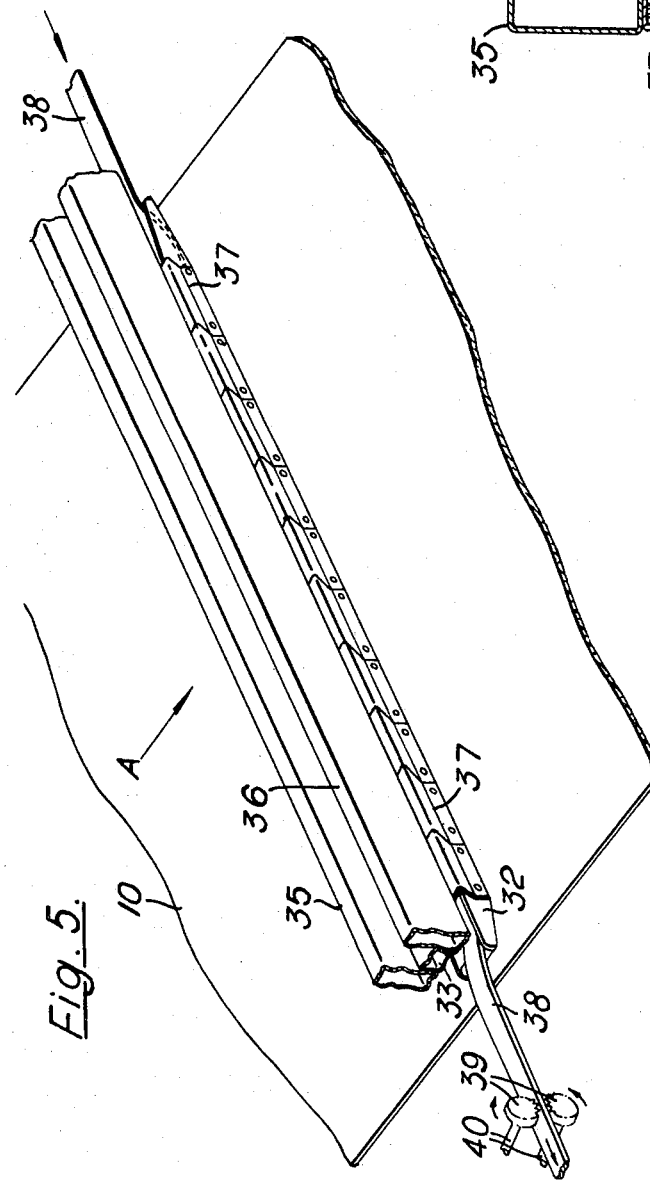
FIG. 5 is a modification of the apparatus of FIGS. 3 and 4 in which the locating member is in the form of a continuous strip.

In another embodiment as illustrated in FIGS. 5 and 6 the locating member for the pool 21 of molten material is a metal strip 38, for example a copper strip, which is of dovetail formation and dovetails into a groove of complementary form in the lower surface of the shoe 32. The shoe 32 is connected to the cooled beam unit by flexible strips 37 in the same way as in FIGS. 3 and 4. Outside the tank structure the copper strip 38 is engaged between knurled wheels 39 fixed to the ends of shafts 40 which are driven so as to draw the strip 38 slowly through the groove in the shoe for example at the rate of 1" per minute. In this way the lower surface of the strip-shaped locating member 38, to which the body 21 of molten metal clings, is continuously renewed. The engagement of the dovetail-shaped strip in the groove in the shoe 32 ensures good thermal contact and heat extraction from the pool 21 through the strip 38, the shoe 32 and the flexible strips 37 to the water cooled beams 33, 35 and 36.

FIGS. 7 and 8 illustrate a modified form of the apparatus of FIGS. 3 and 4 in which the locating member in the form of the anode bar 30 is keyed into a shoe 32 which has an upstanding central fin 40 projecting upwardly from the back of the shoe 32. This fin 40 is provided at intervals with vertically-slotted holes through which pass clamping bolts 41 which engage through tubular apertures 42 formed in two parts 43 and 44 of the hollow beam which is supported in the tank structure. The clamping bolts 41 ensure there is good face-to-face abutment of the fin 40 with inner faces of the two beam sections 43 and 44 and the control of the flow of water through the beam sections 43 and 44 regulates the extraction of heat from the pool 21 through the fin 40.

FIG. 9 illustrates a modified form of this embodiment in which thermal contact between the fin 40 and the water cooled beams 43 and 44 is effected through thermally conducting spacer elements 45 which are clamped by the bolt 41 between the fin 40 and the inner faces of the cooled beam sections 43 and 44. The spacer elements may be in the form of bars of metal extending right along the length of the beams 43 and 44.

Yet another modification of the invention is illustrated in FIGS. 10, 11 and 12 in which the shoe 32 which has an upstanding central fin 40 has a dovetail groove in its lower surface to receive a dovetail-shaped copper strip 38 in the same manner as illustrated in FIGS. 5 and 6. In the embodiments of FIGS. 10 and 11 thermal contact between the fin 40 and the two water-cooled beam sections 43 and 44 is effected in the manner described above with reference to FIG. 8, while in FIG. 12 the thermal connection between the fin 40 and the beams 43 and 44 is the same as illustrated in FIG. 9.

In FIG. 10 there are guide members 46 of cylindrical form mounted between brackets 47 at either end of the shoe 32 to guide the copper strip away from the glass at the ends of the dovetail groove in the shoe 32, and thus define the ends of the pool within the width of the ribbon.

FIGS. 13 and 14 illustrate a modified form of locating member of the kind illustrated in FIGS. 5 and 6 in which the cooled support beam is in three parts 33, 35 and 36 and the shoe 32 is suspended from the central beam part 33 by hanger bolts 34. The metal strip to which the pool 21 clings, in this case a copper strip, is a hollow metal strip which is extruded copper having a central hollow 48. Water flows into this strip at one side of the tank structure as indicated by the arrow 49 in FIG. 13 and is exhausted from the other end of the strip as indicated by the arrow 50 after the strip has passed between the engaging wheels 39 which draw the strip through the shoe and across the tank structure. The water cooling of the strip 38 itself replaces the provision of the flexible strips 38 of FIGS. 5 and 6 and additional regulation of the temperature of the molten body 21 is provided by regulating the temperature and flow of the water entering the strip 38 and flowing through its interior 48.

FIGS. 15 and 16 illustrate yet another embodiment in which the three part beam 33, 35 and 36 is employed. The anode bar 30 which is keyed into a shoe 32 suspended by bolts 34 from the central beam part 33 is formed with a gulley machined along the entire upper surface of the bar. This gulley is illustrated at 51, and extends deeply into the material of the anode bar 30 so that the bottom of the gulley is close to the lower surface of the bar 30 which is wetted by the molten body 21. A hairpin cooler tube is located in the gulley, having an inlet limb 52 and an outlet limb 53. These limbs are of heat resisting steel tubing, for example, and extend out through the side wall 5 of the tank structure. Water at a controlled temperature and pressure is circulated through these tubes to provide controlled cooling of the anode bar 30 and therefore controlled heat extraction from the molten body 21. After the cooler 52, 53 has been placed in position in the gulley, the gulley is filled with a molten metal 54, e.g. tin or bismuth, which is normally molten at the temperature of operation anywhere in the float bath and which may be frozen by the action of the cooler. The molten metal provides excellent thermal contact between the limbs 52 and 53 and the interior of the bar 30. In one embodiment for example it has been found that water at 50° C. is circulated through the cooler tubes 52 and 53 to maintain a temperature of about 150° C. at the lower surface of the anode bar 30 which, when the glass ribbon is at 900° C., ensures that the molten body 21 is maintained at a temperature of about 600° C.

A modified form of cooler in a gulley in the anode bar 30 is illustrated in FIGS. 17 and 18. The ends of the bar 30 are tilted upwardly as indicated at 55 in FIG. 17, there being V-cuts 56 in the top face of the T-shaped top 31 of the bar which provide lines of weakness to permit the upward bending of the bar ends. Engaging under the T-shaped top of each end part 55 of the bar is an inturned foot 57, of a plate 58 which is pivoted at 59 to a fixed bracket 60. An abutment 61 projects from the outer top corner of each plate 58, and one end of a lever 62 which is pivoted at 63 to a fixed bracket 64 engages under the abutment 61.

The other end of the lever 62 has a bearing piece 65 fixed to it and an adjustable wedge 66 has an inclined face 67 which bears on the surface of the bearing piece 65. The back of the wedge 66 is flat and is held in engagement with the underface of the beam 33. There is a threaded bore 68 through the wedge and a screw adjustment 69 operation of which moves the wedge 66 inwardly to force the outer end of the lever 62 down, which motion is transmitted by the plate 58 to bend upwardly, as shown, the end 55 of the bar engaged by the plate foot 57.

The upward tilting of the bar ends 55 retains the molten tin 54 in the gulley. The cooler is in the form of a divided rectangular section tube forming two parts 70 and 71. Water is circulated in through the upper part 70 and extracted through the lower part 71, and with sufficient cooling the tin 54 in the gulley is frozen.

FIGS. 19 and 20 illustrate yet another construction for dissipating heat from the anode bar 30 through a water cooled tube via the molten metal 54 in the gulley formed in the upper surface of the bar 30.

In the embodiment of FIGS. 19 and 20 there are extensions 72 at either end of the bar 30 which do not extend downwardly as far as the central part of the bar 30. These extensions do not pick up heat directly from the ribbon of glass and they are therefore at a sufficiently low temperature to ensure that the tin 54 in the gulley is frozen at either end of the gulley even during the setting up operation when the extraction of heat through the cooling tube is being adjusted.

Although the invention has been described with particular reference to surface modification of a ribbon of glass by the passage of direct electric current from the body of molten material 21 through the glass into the bath of molten metal it will be understood that the method and apparatus of the invention may be applied to other processes for the surface modification of a ribbon of glass for example a process in which oxidation conditions at the interface between the body 21 and the upper surface of the ribbon of glass are controlled in such manner as to provide positive control of the ionic migration from the pool into the glass surface without the use of direct current.

The invention may be applied to the surface treatment of glass articles, for example hollow glass articles such as moulded glass insulators or moulded glass half blocks, or to the treatment of glass in sheet form whether plane or curved for example television tube face plates which are usually curved, or curved glass for use as windscreens or rear lights of motor vehicles.

The invention thus provides an improved method for the surface modification of glass, in particular for application to the float process for the manufacture of flat glass, in which the life of components of the surface modification apparatus is extended and there is improved ability for treating the ribbon of glass at high temperatures for example 950° C. without introducing any distortion in the glass thereby ensuring the preservation of the float qualities in the ribbon of glass.

This new technique is also of relevance to a lower temperature treatment of the glass which is at a higher temperature. When the glass is at about 950° C. extraction of heat from the molten body 21 will chill and stiffen the top surface of the ribbon of glass locally as it passes beneath the body 21, and the chilled surface is rapidly reheated by radiation and conduction once it is passed from beneath the pool. This gives improved abrasion and weathering resistance of the modified surface of the glass because the surface modification is effected deeper into the hotter glass. A wider range of tints of the glass is also made possible.

The invention also comprehends glass having desired surface characteristics produced by the method of the invention whether in ribbon or sheet form or in the form of treated glass articles.

The invention can also be applied to more localised heat exchange with a glass surface, and an application of this is illustrated in FIGS. 21 to 23.

A buoyant body of molten glass is produced on a bath of molten metal 1 and is advanced along the bath and, as is customary in the float process, is cooled through a plastic state as it is advanced. When the glass is to be attenuated, for example to produce glass having a thickness say 3 mm., the advancing glass passes over a region of the bath where it is maintained in a transitional plastic state, in which state the glass is susceptible to attenuation by longitudinally acting tractive force applied for example by conveyor rolls at the outlet end of the bath to the ultimate ribbon of glass produced.

The advancing ribbon of glass in a plastic state is indicated at 73 in FIG. 21, and is advancing in the direction of arrow 74 along the surface of the bath 1. The glass is being attenuated while it advances and the decrease in width of the ribbon which accompanies the reduction in thickness is regulated by cooling the margins of the plastic glass to form two stiff strips of glass, indicated at 75 and 76 which extend along the ribbon and militate against the tendency of the ribbon to shrink in width in the course of attenuation by longitudinally applied tractive force.

Heat is extracted locally from the margins of the ribbon by bodies of molten material 77 which cling to two locating members 78 positioned one at each side of the tank structure so as to overlie the margins of the glass 73 in the plastic state. The locating members 78 are of identical construction and each is in the form of a hollow metal box, e.g. of copper, in which there is a central partition 79 extending downwardly from the roof of the box to define a gap 80 above the floor 81 of the box to which the molten body clings. Inlet and exhaust pipes 82 and 83 communicate with the box to either side of the partition 79, which promotes circulation of cooling fluid, usually water, against the inside surface of the floor 81. Regulation of the temperature and rate of flow of the cooling fluid is effected to regulate the rate of heat extraction from the margins of the glass by conduction through the molten bodies 77.

The locating members extend generally parallel to the edges of the ribbon of glass so that the viscous strips 75 and 76, in the margins of the ribbon have a width corresponding to the width of the locating members 78 and the cooling of the margins is thereby localised. For more intensive marginal cooling the cooled locating members 78, with their clinging bodies 77 of molten metal, may extend for a greater distance along the margins of the advancing glass.

The stiffened margins of the ribbon can be as much as 100° C. cooler than the rest of the ribbon of glass, and permit only a predetermined reduction in ribbon width during its attenuation so that a greater width can be preserved in the glass which is being thinned by attenuation.

We claim:
1. A method of manufacturing surface modified float glass comprising the steps of:
   advancing a ribbon of float glass along a molten metal bath;
   placing an elongated molten metal body in contact with the upper surface of the glass;
   maintaining the molten metal body in a defined localized contact area by wetting the molten metal body on to a generally flat surface of a thermally conductive locating member comprised of a metal soluble in said molten metal body, which locating member is positioned adpacent the upper glass surface;
   cooling the locating member to a temperature sufficiently below the temperature of the glass advancing beneath the molten body to decrease the solubility of said metal of the locating member in the molten metal body by an amount effectively minimizing erosion of said wetted surface of the locating member by the body of molten material; and
   effecting ionic migration from the molten metal body into the upper glass surface at the localized contact area.

2. A method according to claim 1 wherein said locating member is comprised of copper and said molten metal body is comprised of a copper alloy.

3. A method of manufacturing surface modified float glass comprising the steps of:
   advancing a ribbon of float glass along a molten metal bath;
   placing an elongated molten metal body in contact with the upper surface of the glass;
   maintaining the molten metal body in a defined localized contact area by wetting the molten metal body on to a generally flat surface of a thermally conductive locating member comprised of a metal soluble in said molten metal body, which locating member is positioned adjacent the upper glass surface;
   heating the locating member to a temperature sufficiently above the temperature of the glass advancing beneath the molten metal body to ensure sufficient solubility of said metal of the locating member in the molten metal body to facilitate replenishment of the molten metal body by dissolution of said metal of the locating member; and
   effecting ionic migration from the molten metal body into the upper glass surface at the localized contact area.

4. A method according to claim 3 wherein said locating member is comprised of cobalt and said molten metal body is comprised of a colbalt/bismuth alloy.

5. A method according to claim 4 wherein the locating member is electrically heated.

References Cited
UNITED STATES PATENTS

| | | | |
|---|---|---|---|
| 2,075,446 | 3/1937 | Leibig | 65—30 X |
| 2,968,578 | 1/1961 | Mochel | 65—30 X |
| 3,151,366 | 10/1964 | Fromson | 65—182 X |
| 3,218,220 | 11/1965 | Weber | 65—30 X |
| 3,393,987 | 7/1968 | Plumat | 65—30 X |
| 3,429,742 | 2/1969 | Grego et al. | 65—30 X |
| 3,467,508 | 9/1969 | Loukes et al. | 65—30 |
| 3,486,995 | 12/1969 | Evers | 65—30 X |
| 3,524,739 | 8/1970 | Loukes et al. | 65—30 X |
| 3,528,847 | 9/1970 | Grego et al. | 65—60 X |

OTHER REFERENCES

"Glass Industry" Jan. 1968, two major developments announced in one month, pp. 14 & 15. Copy found in class 65 subclass 30.

FRANK W. MIGA, Primary Examiner

U.S. Cl. X.R.

65—60, 182, 201